Nov. 9, 1965  J. R. ROBERTS  3,216,167
PREFABRICATED PANEL
Filed May 22, 1961  2 Sheets-Sheet 1
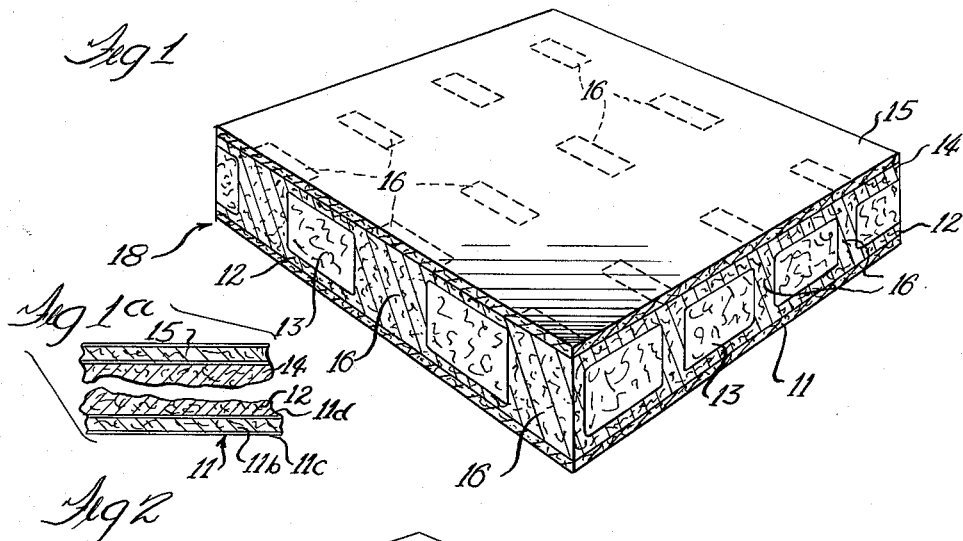
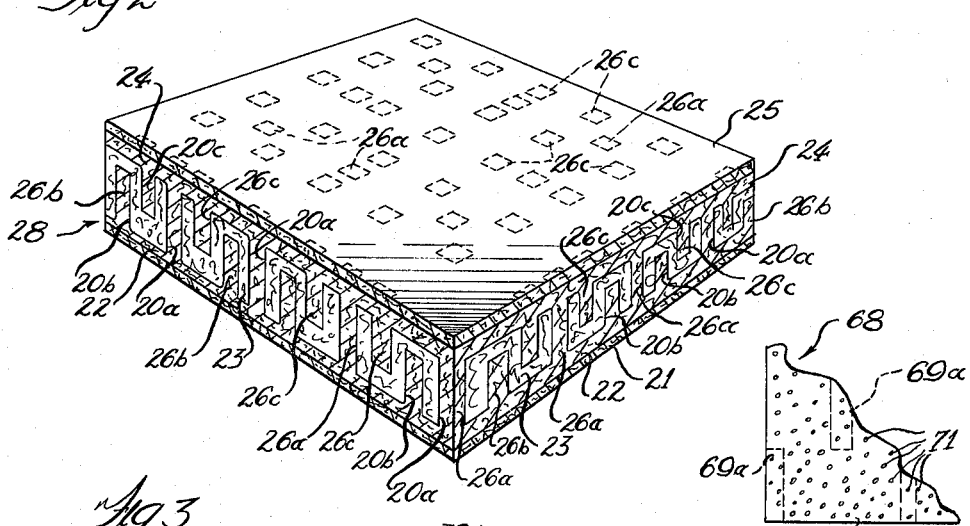
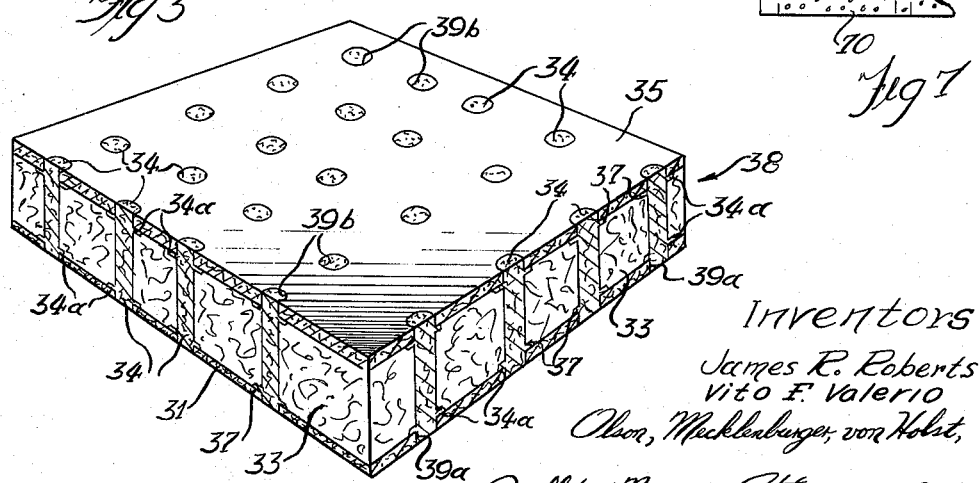
Inventors
James R. Roberts
Vito F. Valerio
Olson, Mecklenburger, von Holst,
Pendleton & Neuman  Attorneys

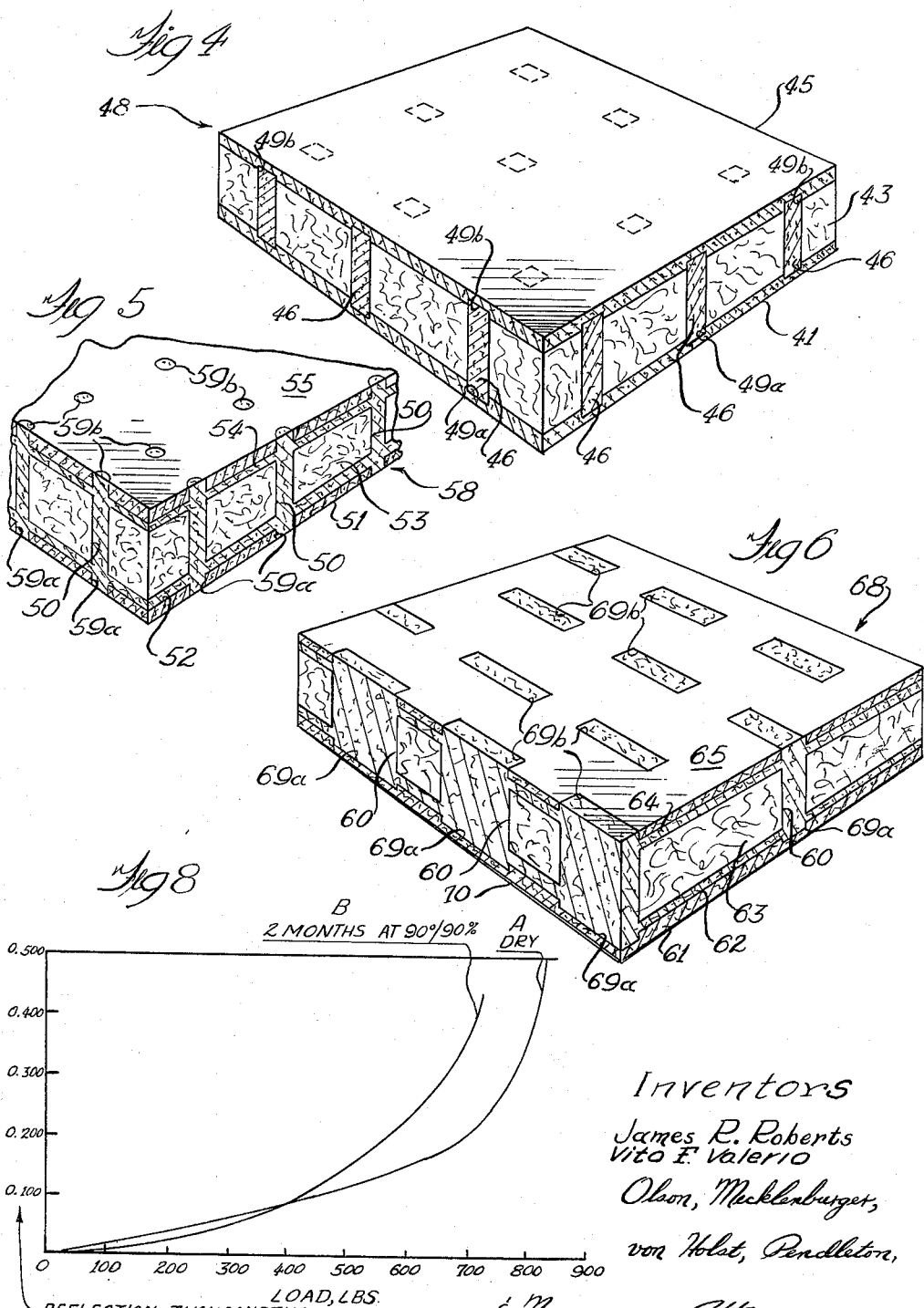

United States Patent Office 3,216,167
Patented Nov. 9, 1965

3,216,167
PREFABRICATED PANEL
James R. Roberts, Palatine, and Vito F. Valerio, Berwyn, Ill., assignors to United States Gypsum Company, Chicago, Ill., a corporation of Illinois
Filed May 22, 1961, Ser. No. 111,588
3 Claims. (Cl. 52—612)

This invention relates to prefabricated panels adapted to be used as roof decks, interior partitions, floors and the like and, more particularly, relates to prefabricated structural panels especially adapted to be constructed of gypsum and insulation materials.

Prefabricated panels have found and are finding a wide range of usage in present day commercial construction. To meet the various requirements encountered in the varied uses to which such panels are being put, the panels should possess several desirable characteristics. Among these characteristics are strength, for structural application, fire resistance, thermal insulation, light-weight, simplicity of fabrication, sound absorption and economy. Prior panels have often failed to provide one or more of these characteristics. This invention provides a structural panel satisfying these various requirements to a high degree and does so with materials and in a manner which are new, novel and unobvious from prior teachings in this art.

One of the primary objects of this invention is to provide a prefabricated structural panel that is strong and versatile and may be utilized as a ceiling panel, wall partition, floor, roof deck, roof deck insulation or the like.

Another object is to provide a structural panel that is economical to produce commercially.

Another object is to provide a structural panel of gypsum board and insulation board that is superior in strength to any comparable panel heretofore provided.

another object is to provide a structural panel that has exceptional insulation properties.

Another object is to provide a panel having good acoustical absorption characteristics.

Another object is to provide a structural panel that has a high fire rating.

Other objects and advantages will become apparent from the following description, accompanying drawings, and appended claims.

In accordance with one embodiment of this invention, a panel is constructed in the following manner: A rigid fire resistant sheet of material, such as gypsum board (a core of set calcined gypsum with cover sheets of suitable paper or the like) is placed flatly within a form having an even surface. A settable cementitious slurry such as of calcium sulfate hemihydrate is poured on the flat rigid base sheet. A comparatively light weight perforated insulation board, such as a semirigid layer of compacted mineral fiber, glass fiber, wood fiber or bagasse fiber, or particle board, with or without various appropriate binders or aggregates therein, is placed in superposed relation to the base sheet and the layer of slurry on the base sheet. A second portion of the liquid slurry is poured on the perforated board and allowed to fill the perforations in the board to unite or combine with the lower layer and also to form a layer above the perforated board. The assembly is then completed by placing a second rigid sheet similar to the base sheet on the second layer of slurry. After the slurry has set, the completed assembly is comprised of a core of insulation board and rigid cast material between bonded layers of gypsum board, including five layers, i.e., the first layer is a rigid sheet, the second layer is rigid set material, the third layer is a perforate insulation board with rigid cast material filling the perforations, the fourth layer is another layer of rigid set material, and the fifth layer is another rigid sheet. It will be noted that the two layers of cast material are integrally connected to each other through the filled perforations in the semirigid material comprising the center layer of the panel.

In the accompanying drawings, several embodiments of this invention are illustrated.

FIG. 1 is a cross-sectional view in perspective of a portion of a panel employing this invention;

FIG. 1a is an enlarged fragmentary cross-sectional view of the panel of FIG. 1;

FIGS. 2, 3, 4 and 6 are cross-sectional views in perspective of other embodiments of the invention;

FIG. 5 is a fragmentary cross-sectional view in perspective of another embodiment of the invention;

FIG. 7 is a bottom view of a fragmentary portion of the panel illustrated in FIG. 6; and FIG. 8 is a graph, showing the dry strength of the embodiment of FIG. 1 in Curve A and showing the 90—90 strength of the same embodiment, i.e., after having been exposed to a temperature of 90° F. and 90% relative humidity for two months, in Curve B.

The panel of this invention is most often described hereinafter in terms of a preferred embodiment of the invention with preferred materials being set forth. It is not meant, however, to exclude equivalent materials that could be substituted for those particularly noted.

Panel 18, shown in FIG. 1, is formed with a rigid base sheet 11 of gypsum board. The gypsum board 11 may be of the usual construction illustrated in FIG. 1a, including a set calcined gypsum core 11b and suitably treated paper front and back cover sheets 11c and 11d. Sheet 11 is placed in a suitable mold. A slurry of calcium sulfate hemihydrate is poured over sheet 11 to provide the second layer 12. A perforate insulation board 13 of mineral fiber is placed on the layer 12 to provide the third layer. Another layer 14 of the cementitious slurry is poured over board 13, with sufficient slurry being deposited to fill the perforations in board 13, as at 16, to thereby join layers 12 and 14. Sheet 15 of gypsum board is then placed on layer 14. After the slurry has set to a rigid cast, there is provided a five layer panel comprising a first layer 11 of rigid sheet material, a second layer 12 of rigid cast material, a third layer 13 of perforated insulation material, a fourth layer 14 of rigid cast material integrally attached and connected with the second layer of rigid cast material by columns 16 within the perforations in the perforate insulation board, and a fifth layer 15 of rigid sheet material similar to the base sheet material. The cast material adheres to the gypsum board layers to form firm bonds therewith and unite the various layers into an effective prefabricated panel unit.

Though the perforations may be of any desirable configuration, as illustrated in other figures of the drawings, the perforations in insulation layer 13 of FIG. 1 have been shown as rectangular.

The panel 28 shown in FIG. 2 is similar to that of FIG. 1 in construction and materials, but differs in the details of the form of the perforate insulation layer and the resulting core. In this modification, the insulation board 23 is formed with perforations 20a which extend through the board, as well as additional openings 20b and 20c which extend somewhat more than half-way, but not all the way through the board. The two outer sandwiching layers 22 and 24 of rigid cast material include portions extending into and filling holes 20b and 20c, to form overlapping studs or pillars 26b and 26c integral with layers 22 and 24 respectively. The two cast layers are connected by integral pillars 26a, extending through holes 20a, there being at least one pillar 26a per square foot of the panel. Outer rigid layers of gypsum board 21 and 25 are placed above and below the core as are sheets 11 and 15, shown in FIG. 1. The various perforations and pillars illustrated in FIG. 2 are of a square cross section.

The panel 38 shown in FIG. 3 also includes two rigid outer gypsum board layers 31 and 35 and a center layer of a perforate insulation board 33. The perforations in board 33 may be enlarged at each surface of the board to provide a washer-shaped depression 37, as shown, on each face of the board. The outer sheets 31 and 35 are provided with perforations 39a and 39b, respectively, aligned with the perforations in the interposed board 33 to provide openings completely through the panel. A slurry of calcium sulfate hemihydrate 34 is poured into and allowed to fill the aligned perforations of assembled board 33 and layers 31 and 35. After the slurry has set, panel 38 is complete. The cast cementitious material 34 forms a firm bond with the core material of sheets 31 and 35. It will be noted that the enlarged surface openings 37 of the perforations in board 33 will be filled with cementitious material 34 to form enlarged portions 34a thereby preventing relative movement of the resulting columns of material in a vertical direction. The openings in the central and outer layers are illustrated as being cylindrical in this figure to show another permissible form for the various openings.

FIG. 4 illustrates another embodiment of the invention somewhat similar ot the panel of FIG. 3. In this modification panel 48 includes outer rigid gypsum board sheets 41 and 45 provided with holes 49a and 49b therein aligned with the openings in inner perforate board 43. The holes 49a and 49b, in boards 41 and 45 respectively, communicate with the inner surfaces of these boards but do not extend all the way therethrough, as shown. The cast material filling the aligned openings thus forms columns 46 extending through the insulation board 43 and into but not through boards 41 and 45. As the columns terminate within boards 41 and 45, movement of the columns is prevented by their location. Enlarged portions, as at 34a in FIG. 3, or continuous layers of material, as at 14 in FIG. 1, may thus be eliminated with a consequent saving in weight, material and cost. This panel (FIG. 4) may be fabricated by subjecting the superposed layers to pressure, such as by passing them between pressure rollers, before the slurry sets, to force the slurry into the holes 49a and 49b. It has been found desirable to pin-perforate the boards 41 and 45 at each hole 49a and 49b to permit egress of trapped air during fabrication of this type of panel.

FIG. 5 illustrates another embodiment of the invention combining features of the embodiments shown in FIGS. 1 and 3. Here panel 58 includes perforated gypsum boards 51 and 55 disposed with the openings 59a and 59b aligned with openings 50 through insulation board 53. The cast material fills the aligned openings as in FIG. 3, but also forms layers 52 and 54 as in FIG. 1.

FIGS. 6 and 7 illustrate a further and particularly desirable embodiment including certain features of the embodiments shown in FIGS. 4 and 5. Here panel 68 is of a five layer construction similar to the embodiment shown in FIG. 5, but the holes 69a in the first gypsum board layer 61 extend only partially through that layer as in the embodiment shown in FIG. 4. This construction is economical and simple to fabricate as openings 69a are easily filled by gravity when depositing the first layer 62 of slurry, and openings 69b can readily be completely and uniformly filled by screeding a small amount of slurry over the top of the upper glysum board sheet 65 after that layer is in place. Perforations 60, in the central insulation layer 63, and aligneds holes 69a and 69b are elongated (rectangular) and are sized and disposed to be longitudinally overlapping as illustrated. As a result, the cast columns extending between the cast layers 62 and 64, as well as the portions extending into holes 69a and 69b, are also longitudinally overlapping, thereby adding to the strength and uniformity of the panel.

Further, FIGS. 6 and 7 illustrate the inclusion of a reinforcing lamina 70 such, for example, as wet strength paper, which may be added to the outer surface of either or both sides of the panel. In this example it is added to the face side of the panel which is provided with a plurality of small holes 71 extending through layers 70, 61 and 62 to the layer 63. Such or similar holes may be provided in one or both surfaces of panels made in accordance with this invention for acoustical absorption and/or decorative purposes. Holes 71 are primarily for acoustical purposes and are distributed over the face of the panel in any suitable geometrical pattern, or randomly distributed such as illustrated, and may be formed by drilling after the panel is set. The extra layer of wet strength paper is particularly desirable in this construction to compensate for the strength loss normally encountered when the bottom board is perforated and also is instrumental in maintaining the strength of the panel when the panel is subjected to high moisture conditions. The reinforcing layer may be added to the appropriate surface of the gypsum board prior to assembly, but is preferably secured to the panel, as with a water resistant adhesive, subsequent to the assembly of the various other layers.

In embodiments such as those shown in FIGS. 5 and 6, it is not necessary that the holes in the gypsum board layers be aligned with the perforations in the central layer as the cast layers integrally joint the material filling the various perforations, openings and holes regardless of their alignment or misalignment.

Several embodiments of this invention have been shown and described. However, many modifications may be made in the embodiments shown in the light of the teachings of this invention. Partial keys or columns such as illustrated in FIG. 2 may be utilized without a bottom and/or top slurry layer; for instance by utilizing teachings illustrated in FIGS. 3 and 4. The embodiment shown in FIG. 3 may be modified to include features illustrated in FIG. 1, i.e., a continuous layer of the cast cementitious material may be added between board 33 and either layer 31 or 35, or both layers (see FIG. 5). The panel illustrated in FIG. 4 may also combine the features of the panel shown in FIG. 1 by placing layers of the cast cementitious material between outer layer 41 and board 43 and/or between outer layer 45 and board 43. It will be understood, of course, that the addition of extra material in the panels of FIGS. 3 and 4 as above described, or by adding two layers as in FIGS. 5 and 6, will increase the weight of the panels along with their strength. This sacrifice in economy and increase in weight is not desirable in some applications inasmuch as the panels illustrated in FIGS. 3 and 4 have sufficient strength for many uses.

Though it is of course impossible to anticipate all the various combinations obtainable through the utilization of this invention, many modifications will become apparent upon noting some aspects of the theory of operation embraced by the invention in certain applications.

A panel constructed with two rigid outer sheets having columns extending therebetween in the manner of this invention will carry an extraordinarily large load due to the manner in which the load is directed and transmitted from the upper load bearing sheet to the lower sheet of the panel. It must be remembered that the force on the columns is not all directed vertically. When the upper sheet is deflected, force is directed on the keys or columns between the sheets in a horizontal as well as vertical direction which, in turn, has a tendency to cause the keys or columns, separating the two outer sheets, to shear from their upper and/or lower attachment. This is true whether the columns or keys are directly attached to the outer sheets or are integrally attached to layers sandwiched by and secured to the outer sheets. The keys or columns can be more firmly kept in place against such shear forces by placing nails or similar reinforcing devices through the outer sheet, to protrude into the columns or keys prior to their hardening or setting. Also, the insulation layer may be kerfed in a grid pattern along the rows of openings to permit the cast material to join all the keys or columns to one another adjacent each surface of the center board. This will provide stability and reinforcement for the keys. A third method of preventing the columns or keys from shearing is to increase the number of columns or keys along each end of the panel, thus preventing deflection, slippage and consequent shearing of the keys or columns. In this regard the intervals at which perforations and columns or keys are provided may vary somewhat, taking into consideration the specific application of a given panel.

The specific manner in which the panels above described are constructed may also be modified in accordance with the specific materials incorporated therein. For example, it is highly desirable to use a gypsum product known as alpha gypsum such as described in W. S. Randel et al., U.S. Patent No. 1,901,051, inasmuch as a cast made therefrom has a high density and extraordinary strength. Also, it is desirable to render the gypsum products insensitive to water. Water resistance may be brought about by adding asphalt and wax to the calcium sulfate hemihydrate slurry in accordance with the teachings of U.S. Patent No. 2,432,963 to Camp. The core of the gypsum boards may be similarly treated and the paper cover sheets may also be rendered water resistant by treatment with petrolatum, as taught in Camp U.S. Patent No. 2,560,521, to provide a sheating type board.

Another gypsum product which can be utilized in the panels of this invention to good advantage is a water resistant gypsum composition, including a small amount of Portland cement, such as is described in M. C. Dailey U.S. Patent No. 2,292,616.

An illustrative embodiment of my invention incorporating a preferred combination of gypsum products and insulation material is constructed as follows:

Example

A panel is constructed in a manner similar to that described with respect to FIG. 1. A sheet of gypsum board ½″ thick is provided as the base layer. A first portion of a slurry of alpha gypsum hemihydrate is poured onto the gypsum board to provide a ⅛″ layer of slurry. A perforate mineral fiber insulation board is placed on the ⅛″ slurry layer. A second portion of slurry is added to fill the perforations of the insulation board and also to provide a layer of approximately ⅛″ of slurry above the insulation board. The upper layer of slurry connects to the lower layer of slurry through the perforations in the insulation board. A second sheet of gypsum board of the same dimensions as the first is placed on the upper layer of slurry to thereby complete the panel. The finished panel is 2¼″ thick and consists of five layers of material. The panel as constructed weighs about 7 pounds per square foot. The panel may be dried in the same manner as gypsum board, or may be shipped wet. It is desirable, however, to dry the panel even though there is little shipping weight added by the water.

Two panels 12 inches wide and constructed as described in the above example were tested. The first panel was tested for dry strength and the second panel was tested after having been subjected to 90° F. temperature and 90% relative humidity for a period of two months. FIG. 8 graphically indicates the inherent qualities of the panel constructed in accordance with this example. Curve A shows deflection plotted against load for the first panel tested, i.e., the dry panel. This panel was placed on a 36″ span and weighted at quarter points. It may be noted that the deflection of this panel was .080″ with a total load of 400 pounds, and the breaking load was 845 pounds. Curve B shows deflection plotted against load for the second panel tested, i.e., after two months exposure to 90° F. temperature and 90% relative humidity. This panel was also placed on a 36″ span and weighted at quarter points. It may be noted that the deflection of the second panel was also .080″ with a total load of 400 pounds. The ultimate breaking load of the second panel was 730 pounds.

The example above described provides a panel of gypsum products and insulation materials, with highly desirable qualities. The cast gypsum when set forms bonds with the gypsum board layers as well as with the insulation board core at the respective interfaces and transmits shear and compressive loads between the various layers. The columns, primarily, transmit these loads between the cast layers. The gypsum products, i.e., the gypsum board outer sheets and gypsum layers in the core of the panel, are noncombustible and economical. The insulation board, i.e., compacted mineral wool or the like, is also noncombustible, lightweight, economical and provides good insulation properties. The resulting panel is noncombustible, economical to produce, relatively lightweight, provides good insulation properties and is very strong. A panel capable of varied structural uses is thus provided utilizing materials normally considered nonstructural.

The various perforations or openings and the resulting columns or keys in the core of the panel, may be of various cross sections. The particular columns shown in the various figures are merely to illustrate the invention. however, it is important that the various openings be provided with sufficiently large dimensions to insure filling with the gypsum slurry. It has been found that a minimum cross-sectional dimension of about ⅛″ should be observed. It is important, too, that the columns or keys do not become too numerous or of too great total cross section because of the increase in panel weight and decrease in insulation value brought about by their presence. It has been found desirable to minimize the total area of these columns to keep the panel as light in weight as possible without sacrificing strength. The panels of the above recited example, with test results in FIG. 8, included keys or columns through less than 10% of the surface area of the insulation board, i.e., the insulation board surface contained less than about 10% perforate area. Panels have also been constructed and excellent results obtained with as little as about 2.0% perforate area. For best results, the total perforate area of the insulation layer should be in the range of about 2% to 10%. Similar limits are applicable to the cumulative total area of the openings in the gypsum board layers of modifications such as are shown in FIGS. 3–6.

The panels illustrated in the drawings of the figures have not been shown with decorative facings; however, it is within the ambit of this invention to apply decorative facings, such as embossed plastic, paper or painted surfaces. Also, asphalt roofing materials may be laminated to the panels of this invention during their manufacture to obtain a semi-finished roof deck product.

It will thus be seen that a versatile structural panel has been provided, which utilizes materials normally considered nonstructural, such as gypsum and mineral fiber insulation board, to obtain a highly satisfactory, economical, new and useful structural panel. This panel has surprisingly high strength, is light in weight, is highly fire resistant, is capable of providing good acoustical absorption, and provides exceptional insulating properties.

While particular embodiments of the invention have been shown, it will be understood, of course, that the invention is not limited thereto since modifications may be made by those skilled in the art in light of the foregoing teachings. It is, therefore, contemplated by the appended claims to cover any such modifications as fall within the true spirit and scope of the invention.

Having thus described and illustrated our invention, We claim:

1. A prefabricated structural panel comprising two generally parallel spaced gypsum board layers, each including a body of set calcined gypsum covered with paper, and a core extending between said board layers, one of said board layers having openings therein extending through said paper at the inwardly disposed surface of such layer and terminating within such board layer, and the other of said board layers having openings extending therethrough, said core including a layer of perforate insulation material, said openings in said board layers being substantially aligned with the perforations in said insulation material, and rigid cast set gypsum material including discrete rigid columns thereof extending through the perforations in said layer of insulation material, and portions of said cast set gypsum material integrally joined to said columns, extending into said openings in each of said gypsum board layers, and bonding directly to said gypsum bodies thereof, for rigidly maintaining said gypsum board layers in generally parallel spaced relation.

2. A prefabricated structural panel as in claim 1 wherein said insulation material comprises a semirigid board of mineral fiber material, and said gypsum material comprises alpha gypsum.

3. A prefabricated structural panel as in claim 1 wherein a continuous layer of cast gypsum material extends between each gypsum board layer and the adjacent surface of said core, each of said cast gypsum layers bonding directly to the adjacent gypsum board surface and being integral with said columns and with the portions of said cast material extending into said openings in the respective adjacent gypsum board layer.

References Cited by the Examiner

UNITED STATES PATENTS

| | | | |
|---|---|---|---|
| 649,363 | 5/00 | Ryan | 50—383 |
| 1,041,389 | 10/12 | Wiederholdt | 50—359 |
| 1,334,672 | 3/20 | Noullet | 50—359 |
| 1,474,657 | 11/23 | Walper | 161—270 |
| 1,700,512 | 1/29 | Pedersen | 50—348 |
| 1,831,058 | 11/31 | Gumfer | 161—115 |
| 1,842,324 | 1/32 | Griffith | 161—115 |
| 1,854,942 | 4/32 | Lapof | 50—348 |
| 1,901,051 | 3/33 | Randel et al. | 23—122 |
| 2,030,998 | 2/36 | Mann | 50—347 |
| 2,292,616 | 8/42 | Dailey | 1—692 |
| 2,432,963 | 12/47 | Camp | 106—116 |
| 2,460,309 | 2/49 | Rapp | 50—464 |
| 2,560,521 | 7/51 | Camp | 156—41 |
| 2,879,662 | 3/59 | Spinelli | 50—348 |
| 3,000,144 | 9/61 | Kitson | 50—348 |

HENRY C. SUTHERLAND, *Primary Examiner.*

JACOB L. NACKENOFF, *Examiner.*